Patented Feb. 9, 1932

1,844,479

UNITED STATES PATENT OFFICE

AZARIAH Y. PEARL, OF WINDSOR, VERMONT, ASSIGNOR TO LABORATOIRES SEVIGNE-PEARL, INC., OF WINDSOR, VERMONT, A CORPORATION OF VERMONT

ORNAMENTAL COATING AND PROCESS OF MAKING SAME

No Drawing.   Application filed May 13, 1927.   Serial No. 191,273.

In my application, Serial No. 120,196, filed July 2, 1926, I have described ornamental coatings made of cellulose derivatives, such as nitrocellulose or other materials, hereinafter specifically enumerated and a method of making such coatings. In accordance with the method therein described, nitrocellulose and a suitable crystallizable compound, such as monobrom camphor, sublimable or vaporizable below the decomposition temperature of nitrocellulose, are dissolved in proper proportion in a common solvent, together, if desired with a colorant such as a dye. The solution is applied as a thin coating to a suitable surface or base, such as paper, and the solvent is permitted to evaporate, preferably under controlled temperature conditions. Upon evaporation of the solvent, the coating sets and the crystallizable compound crystallizes within and throughout the entire coating. The coated product is then heated to about the subliming temperature of the crystals therewithin, causing them to be released and expelled and leaving behind in intaglio in the coating their natural design or configuration. A coating thus made, although composed of nitrocellulose, presents a remarkable appearance and makes possible the production of many beautiful effects, especially when crystallizable compounds forming needle crystals are employed.

There are certain disadvantages inherent in the step of heating the product to expel the crystals. A long period of heating is necessary to produce the desired intaglio effect and consequently, although the coating of sheet material, such as paper, may be carried out rapidly by a continuous process and the evaporation of the solvent and crystallization takes place quickly, the rate of production is limited by such long heating period, and the use of cumbersome and expensive festooning apparatus for supporting the coated paper during such heating is also necessary. The paper is also liable to acquire a pronounced curl during heating, which is difficult to remove. Furthermore, the crystalline effect must be obtained by the use of a crystallizable compound readily vaporizable or sublimable below the decomposition temperature of the nitrocellulose. Monobrom camphor satisfies this requirement and produces a highly attractive crystalline effect, but it is expensive and has a camphor odor which it is difficult to remove from the paper even by long heating and ageing, and which is objectionable when the paper is to be employed for the manufacture of candy boxes or the like.

I have now discovered that if after crystallization has taken place, the coated product is treated for a sufficient period with a material which exerts a pronounced solvent action upon the crystal but which does not appreciably attack the nitrocellulose, sufficient crystal may be dissolved and removed from the coating to produce a crystalline intaglio effect comparable to that obtained by heating. This discovery hence makes possible the successful use of certain odorless crystalline compounds, such as salicylic acid, which are materially less expensive than monobrom camphor but which, owing to their lower volatility, cannot be expelled easily by the action of heat and ageing.

The step of removing the crystal may be accomplished very rapidly by the use of such a solvent, and a much higher rate of production is possible in carrying out a continuous coating operation, as on paper, and without the use of expensive, cumbersome apparatus for carrying out such a step. Thus, the coated paper need only be passed through a bath of the solvent for a few minutes to dissolve sufficient crystal to produce the desired crystalline intaglio effect. Since the crystal may be odorless, only that portion of the crystal readily accessible to the solvent need be removed to produce the desired effect.

Another phase of my invention relates to the conversion of the compound after its crystallization in the coating material has been effected, into water-soluble reaction products, so that water may be employed as the solvent medium, thereby greatly reducing the cost of practising my process. When I employ crystallizable compounds such as salicyclic acid, which are comparatively insoluble in water but which are neutralizable, their neutralization may be effected to form water-soluble salts with solutions of suitable alkalies, as hereinafter described.

The method of the present invention may be practised as by following a procedure substantially as follows. About 12 pounds of nitrocotton and about 25 pounds of salicyclic acid are dissolved in sufficient common solvent to produce a coating composition having a specific gravity of about .95 to .96. If desired, a dye or other colorant may be added to the solution. Preferably, the solvent is of the proper volatility to produce good crystalline growth at about room temperature, say, at about 60° to 75° F. Various volatile solvents may be employed for such purpose, such, for example, as a mixture consisting of 45% to 47% acetone, 45% to 47% ethyl acetate, and 5% to 10% butyl alcohol. The composition may be applied to paper and the solvent permitted to evaporate at about 60° to 85° F. After crystallization is complete, the coated product is passed through a bath of a suitable salicyclic acid solvent, e. g., an aqueous solution of sodium borate or sodium phosphate. Solution of the salicyclic acid occurs because of its neutralization by the alkaline sodium compounds to form sodium salicylate, which is far more soluble in water than salicylic acid. Thus, whereas only .27 grams of salicylic acid dissolves in 100 cc. of water at 20° C., about 111 grams of sodium salicylate dissolves in 700 cc. of water at 15° C. A warm, saturated solution is preferably employed to produce a rapid rate of crystal solution. The product need be kept in the solution for only a few minutes, to dissolve sufficient crystal to produce a satisfactory effect comparable to that produced by heating a coated product for a long period at elevated temperature. In place of an aqueous solution of salts, other salicyclic acid solvents may be employed, such as glycerine, ethyl or methyl alcohol, diluted with 10% to 20% water so as not to attack the nitrocellulose, or a mixture of benzol and methyl alcohol.

Where a crystal such as salicylic acid, which is fairly soluble in water, is employed, the passage of live steam through the paper for a sufficient period of time has been found to remove sufficient crystal to produce a satisfactory effect. It is my opinion that the combined solvent and heating action of the steam results in a steam distillation or sublimation of the salicylic acid.

A method such as hereinbefore described, may also be applied successfully in ornamentally coating wood, celluloid, leather, fabric, or other cellulosic or organic materials which may be subject to injury by heat. In the case of wood, it may be desirable to carry the process further. Thus, after the coating has been applied to the wood and allowed to set, it is washed with a salicylic acid solvent such as borax solution or benzol sufficient not only to dissolve the salicylic acid crystals from the coating and produce a crystalline intaglio therein, but to strike through the coating to the wood and dissolve a certain amount of resin and natural gum from the surface of the wood, particularly when the wood is resinous, such as pine. This accentuates the grain of the wood and adds to the beauty of the product. The coating is then preferably covered with a protective coating, e. g., a water soluble gum such as gum arabic or linseed oil, then preferably rubbed down, and finally surface-finished with a glaze-imparting material such as varnish or shellac. In the case of leather, the salicylic acid solvent which I preferably employ is glycerine, or a mixture of glycerine and water, for not only is glycerine a good salicylic acid solvent but it does no injury to the leather as other solvents, such as volatile solvents, might.

In lieu of salicylic acid, I may employ benzoic acid, or other relatively volatile, inexpensive, and preferably odorless crystalline compound which preferably forms needle crystals and which may be dissolved from the coating in sufficient amount to produce a satisfactory effect. In lieu of nitrocellulose, I may employ any equivalent thereof, e. g., a gum or wax which will form a coacting or film and which is soluble in some solvent in which the crystal-forming substance may be dissolved. A similar effect is produced as with nitrocellulose, through it may lack something of the beautiful appearance incident to the use of nitrocellulose.

Having thus described this invention, it is obvious that it is capable of various changes and modifications without departing from its spirit or scope as defined by the appended claims.

What I claim is:

1. A process which comprises applying a solution comprising salicylic acid and nitrocellulose to a base material, allowing the solvent to evaporate to cause a setting of the nitrocellulose and a crystallization of the acid therein, and treating the product with an aqueous solution of borax.

2. A process which comprises applying to a base material a volatile solvent solution of a water-insoluble coating material and a crystallizable compound comparatively insoluble in water, allowing the solvent to evaporate to cause a setting of the coating and a crystallization of the compound therein reacting upon the compound without appreciably attacking the coating material to produce a water-soluble reaction product, and dissolving the reaction product in an aqueous medium.

3. A process which comprises applying to a base material a volatile solvent solution of a water-insoluble coating material and a crystallizable compound comparatively insoluble in water but neutralizable to produce a water-soluble reaction product, allowing the solvent to evaporate to cause a setting of the coating and a crystallization of the compound therein, neutralizing the compound to produce a water-soluble reaction product, and dissolving the reaction product in an aqueous medium.

4. A process which comprises applying to a base material a volatile solvent solution of a water-insoluble coating material and an acid crystallizable compound comparatively insoluble in water, allowing the solvent to evaporate to cause a setting of the coating and a crystallization of the compound therein, and treating the product with an aqueous solution of alkali to form a water-soluble salt.

5. A process which comprises applying to a base a volatile solvent solution of a water-insoluble coating material and salicylic acid, allowing the solvent to evaporate to cause a setting of the coating and a crystallization of the salicylic acid, and treating the product with an aqueous solution of alkali to form a water-soluble alkali salicylate.

6. A process which comprises applying to a base a volatile solvent solution of a water-insoluble coating material and salicylic acid, allowing the solvent to evaporate to cause a setting of the coating and a crystallization of the salicylic acid, and treating the product with an aqueous solution of alkaline sodium compounds to form sodium salicylate.

7. A process which comprises coating paper with a volatile solvent solution of nitrocellulose and salicylic acid, evaporating the solvent present in the coating to cause a setting of the nitrocellulose and a crystallization of the salicylic acid therein, and then immersing the coated paper in an aqueous alkaline solution to dissolve crystallized salicylic acid from the coating.

In testimony whereof I have affixed my signature.

AZARIAH Y. PEARL.